Aug. 22, 1961   T. A. POULSEN   2,997,310
TRAILER SKID
Filed Dec. 17, 1958

Thomas A. Poulsen
INVENTOR.

BY  Olive D. Olson
Agent

United States Patent Office 2,997,310
Patented Aug. 22, 1961

2,997,310
TRAILER SKID
Thomas A. Poulsen, 6231 NE. 24th Ave., Portland, Oreg.
Filed Dec. 17, 1958, Ser. No. 781,097
2 Claims. (Cl. 280—24)

This invention relates to trailer skids, and has for its principal object the provision of a simplified trailer skid by which to facilitate the movement of an unattached trailer over the ground while simultaneously protecting the trailer hitch component at the end of the trailer tongue.

In the normal use of trailers, particularly boat trailers, it is frequently required that the trailer be uncoupled from the towing vehicle for movement to a site which is inaccessible to the vehicle. For example, it is a frequent occurrence that a bank separates the vehicle from a body of water, requiring that the trailer be disconnected from the vehicle and slid down the bank to the water's edge, for launching the boat. Additionally, it is required that the boat be loaded upon the trailer and the latter then dragged up the bank for attachment to the vehicle.

Thus, it is the purpose of this invention to provide a skid which performs the dual function of facilitating movement of the detached trailer and simultaneously protecting the trailer hitch against damage.

It is another important object of this invention to provide a trailer skid which utilizes the female trailer hitch component on the trailer tongue for mounting of the skid for universal movement relative thereto, whereby to accommodate the skid automatically to uneven terrain while simultaneously sealing and elevating the female trailer hitch component against contact with the ground.

A further important object of this invention is the provision of a trailer skid of the class described which functions additionally as an attachment for a cable or other line for guiding the trailer downward over a bank and for pulling the trailer toward a towing vehicle.

Still another important object of this invention is the provision of a trailer skid of the class described which is of unitary construction devoid of moving parts, whereby to reduce to a minimum the cost of manufacture and the subsequent maintenance and repair.

A still further important object of this invention is to provide a trailer skid of the class described which accommodates the detachable mounting of various sizes of the male ball component of a trailer hitch.

Figure 1:
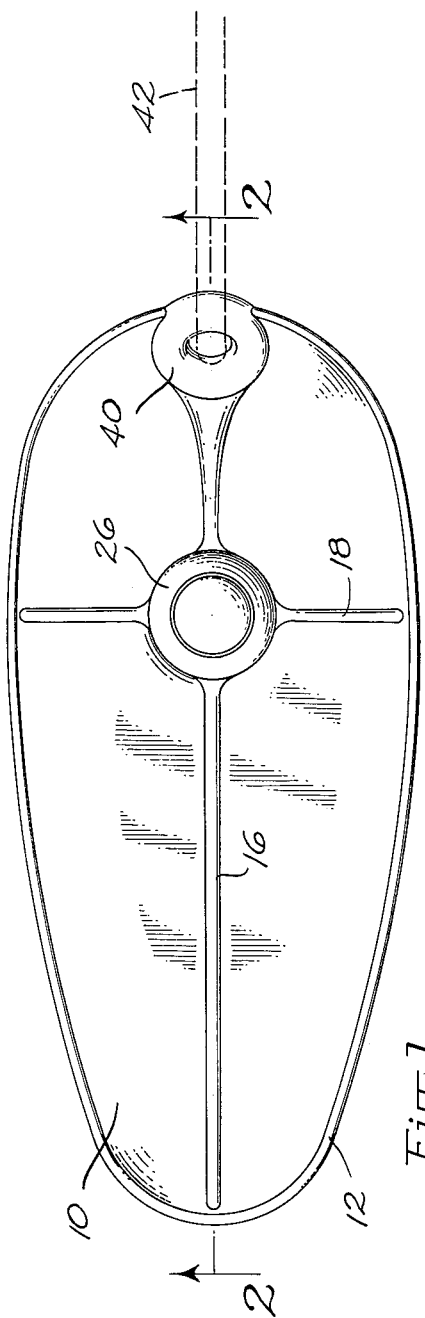
Figure 2:
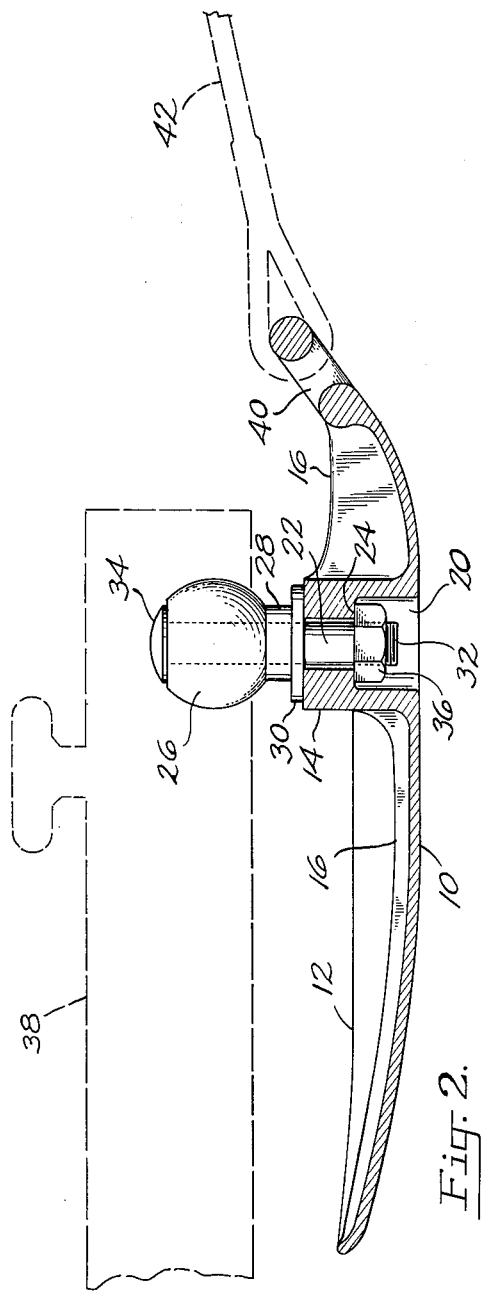

The foregoing and other objects and advantages of this invention will appear from the following detailed description, taken in connection with the accompanying drawing wherein:

FIG. 1 is a plan view of a trailer skid embodying the features of this invention; and FIG. 2 is a vertical sectional view taken along the line 2—2 in FIG. 1, the trailer hitch end of a trailer being shown in dash lines in position of operative connection with the skid, and a hauling line also shown in dash lines in operative attachment to the forward end of the skid.

In the preferred embodiment illustrated, the trailer skid includes a base element formed in the shape of an oblong dish. The bottom 10 of the base element preferably is curved arcuately upward in the direction of its periphery to provide a surrounding wall 12 which functions to divert loose soil and debris as the skid moves over the ground.

An upstanding pedestal 14 projects from the bottom of the base element along the central longitudinal axis of the latter and preferably slightly forward of the longitudinal center thereof. The pedestal preferably is formed integral with the bottom, as by casting the unit from metal, and integral reinforcing ribs 16, 18 preferably are included in this casting, projecting longitudinally and transversely from the pedestal to the periphery of the dished base.

The pedestal is apertured vertically, providing an enlarged lower bore 20 and an upper bore 22 of smaller diameter, defining a shoulder 24 therebetween.

The apertured pedestal is adapted to support the male ball component of a trailer hitch assembly. In the embodiment illustrated, the ball 26 is formed integral with a stem section 28 of reduced diameter and an enlarged base 30. A segment of the ball is cut away diametrically opposite the stem and base, and the ball unit apertured to receive therethrough the threaded shank 32 of a carriage bolt. The rounded head 34 of the carriage bolt replaces the cut-away segment of the ball, to complete the spherical contour of the latter. A securing nut 36 is received within the enlarged lower bore of the pedestal for threaded attachment to the shank of the carriage bolt.

The upper bore 22 in the pedestal 14 is of sufficient diameter to accommodate the threaded shank 32 of various sizes of bolt associated with the various standard sizes of trailer hitch balls. In this manner the trailer skid may be adapted for use with any trailer, since the ball component of the hitch may be matched to the female socket component carried at the forward end of the trailer tongue 38. The ball may be supplied by removing the one from its conventional mounting at the rear of a towing vehicle, or it may be provided as a duplicate of the latter.

Also mounted on the base element of the skid, and preferably formed integral therewith in the casting previously described, is an eyelet 40. This eyelet is located at the forward end of the base element, on the longitudinal center line of the latter, and functions to secure one end of a cable or other line 42. As is well known in this art, such a cable or line conventionally is secured at the opposite end to a power driven winch mounted upon the towing vehicle, or is simply looped about a support for manipulation by hand. In either case, the cable or line is employed as a mechanical assist in lowering the trailer over an embankment and in pulling the trailer upwardly over an embankment.

From the foregoing description, it will be appreciated that, since the trailer skid is attached to the trailer by means of the conventional ball and socket trailer hitch, the base element of the skid will adjust itself automatically to variations in contour of the supporting ground as it moves thereover. Additionally, by attaching the trailer skid to the female socket component of the trailer hitch carried at the forward end of the trailer tongue, the tongue and female component of the hitch is protected against damage by being sealed from and elevated out of contact with the ground.

The elevated position of the eyelet with respect to the bottom of the base element functions under the normal pull of the cable, either in restraining rearward movement of the trailer and skid or in urging forward movement thereof, to maintain the skid upon the surface of the ground and to prevent the base element from burying into the ground. The resistance to movement of the skid upon the ground thus is reduced to a minimum.

It will be apparent to those skilled in the art that various changes may be made in the size, shape and arrangement of parts described hereinbefore. For example, the ball may be formed as an integral part of the pedestal and base element, as by including it in the casting described hereinbefore. The detachable arrangement illustrated is preferred, however, for the advantage of accommodating the various sizes of standard trailer hitch balls. Other changes may be made, as desired, without departing from the spirit of this invention and the scope of the appended claims.

Having now described my invention and the manner in which the same may be used, what I claim as new and desire to secure by Letters Patent is:

1. For use with a trailer having a tongue carrying at its outer end the female socket component of a ball and socket trailer hitch, a trailer skid comprising a base member having a bottom adapted to slide upon the ground, the bottom being curved arcuately upward in the direction of its periphery, an upstanding pedestal formed integral with the base member and projecting upwardly from the bottom thereof intermediate the longitudinal ends of the latter, the pedestal and bottom having a vertical bore therein, a longitudinally bored trailer hitch ball component supported upon the pedestal, securing bolt means extending through the longitudinally bored ball component and pedestal for securing the ball component releasably to the pedestal, and a line attaching eyelet formed integrally with the base member at the forward end thereof.

2. For use with a trailer having a tongue carrying at its outer end the female socket component of a ball and socket trailer hitch, a trailer skid comprising a base member having a bottom adapted to slide upon the ground, an upstanding pedestal formed integral with the base member and projecting upwardly from the bottom thereof intermediate the longitudinal ends of the latter, the pedestal and bottom having a vertical bore therein with a portion of the bore at the bottom end being enlarged, a trailer hitch ball component supported upon the pedestal and having a threaded securing shank extending freely through the vertical bore in the pedestal and bottom, a securing nut mounted releasably on the shank within the enlarged portion of the bore for securing the ball component releasably to the pedestal, and line attaching means formed integral with the base member at the forward end thereof.

References Cited in the file of this patent
UNITED STATES PATENTS

| | | |
|---|---|---|
| 2,132,744 | McCraw | Oct. 11, 1938 |
| 2,189,710 | Draeger | Feb. 6, 1940 |
| 2,509,067 | Leach | May 23, 1950 |
| 2,528,890 | Lawrence | Nov. 7, 1950 |
| 2,704,989 | Konecny | Mar. 29, 1955 |
| 2,723,130 | Andrews | Nov. 8, 1955 |
| 2,844,389 | Burnett | July 22, 1958 |